US007426646B2

(12) United States Patent
Fujimoto

(10) Patent No.: US 7,426,646 B2
(45) Date of Patent: Sep. 16, 2008

(54) COMPUTER APPARATUS, STORAGE APPARATUS, SYSTEM MANAGEMENT APPARATUS, AND HARD DISK UNIT POWER SUPPLY CONTROLLING METHOD

(75) Inventor: Kazuhisa Fujimoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 443 days.

(21) Appl. No.: 11/295,577

(22) Filed: Dec. 7, 2005

(65) Prior Publication Data

US 2007/0079156 A1 Apr. 5, 2007

(30) Foreign Application Priority Data

Sep. 30, 2005 (JP) ............................. 2005-288142

(51) Int. Cl.
*G06F 1/00* (2006.01)
*G06F 1/26* (2006.01)

(52) U.S. Cl. ...................................... 713/300; 713/320

(58) Field of Classification Search .................. 713/300
See application file for complete search history.

(56) References Cited

U.S. PATENT DOCUMENTS

| 7,007,141 | B2* | 2/2006 | Li et al. ....................... 711/162 |
| 7,035,972 | B2* | 4/2006 | Guha et al. ................... 711/114 |
| 7,206,863 | B1* | 4/2007 | Oliveira et al. .............. 709/245 |
| 2004/0054939 | A1 | 3/2004 | Guha et al. |
| 2005/0076255 | A1* | 4/2005 | Bresniker et al. ........... 713/320 |

FOREIGN PATENT DOCUMENTS

| JP | 62-065119 | 3/1987 |
| JP | 9-282057 | 10/1997 |
| JP | 2000-293314 | 10/2000 |

OTHER PUBLICATIONS http://www.copansys.com/pdfs/Revolution2001 DataSheet.pdf.

* cited by examiner

*Primary Examiner*—Rehana Perveen
*Assistant Examiner*—Stefan Stoynov
(74) *Attorney, Agent, or Firm*—Mattingly, Stanger, Malur & Brundidge, P.C.

(57) ABSTRACT

To provide a storage system capable of minimizing a performance deterioration, saving power consumption, and realizing a high reliability. A storage system according to the present invention includes a computer, a storage apparatus connected with the computer, and a storage management apparatus connected to the storage apparatus, the storage apparatus including a hard disk unit to control a data write operation and a data read operation between the computer and the hard disk unit, and control on/off states of power supply of the hard disk unit on a group basis, and the system management apparatus collecting running information about the computer and computer execution job information for each computer, and determining an on/off time of the power supply of the hard disk unit on the group basis to record the collected information and the on/off time of the power supply on the group basis.

20 Claims, 15 Drawing Sheets

231: COMPUTER RUNNING SCHEDULE TABLE

| | COMPUTER #0 | COMPUTER #1 | ... | COMPUTER #127 | ... | COMPUTER #255 |
|---|---|---|---|---|---|---|
| Start | 0:12:00 | 1:00:00 | ... | 0:00:00 | ... | 0:00:00 |
| Stop | 1:12:00 | 1:10:00 | ... | 3:30:00 | ... | 2:20:00 |
| Start | 1:30:00 | 1:30:00 | ... | 3:45:00 | ... | 2:30:00 |
| Stop | 2:15:00 | 2:15:00 | ... | 4:30:00 | ... | 4:30:00 |
| : | : | : | ... | : | ... | : |
| Start | 13:00:00 | 13:00:00 | ... | 13:00:00 | ... | 13:00:00 |
| Stop | 14:00:00 | 14:00:00 | ... | 14:00:00 | ... | 14:00:00 |
| : | : | : | ... | : | ... | : |
| Start | 21:20:00 | 23:10:00 | ... | 22:30:00 | ... | 21:45:00 |
| Stop | 23:50:00 | 24:00:00 | ... | 24:00:00 | ... | 23:55:00 |

235: COMPUTER-VOLUME (LU)-RAID GR. MAPPING

| COMPUTER # | LU # | RAID Gr. # |
|---|---|---|
| 0 | 0 | 31 |
| | 1 | 31 |
| | 2 | 31 |
| 1 | 58 | 12 |
| | 59 | 21 |
| ⋮ | ⋮ | ⋮ |
| 145 | 21 | 0 |
| | 47 | 15 |
| | 108 | 0 |
| | 135 | 15 |
| ⋮ | ⋮ | ⋮ |
| 255 | 63 | 7 |
| | 127 | 8 |

233: RAID GR. POWER SUPPLY CONTROL SCHEDULE TABLE

| LU # | RAID Gr. # | POWER ON | POWER OFF | ... | POWER ON | POWER OFF | ... | POWER ON | POWER OFF |
|---|---|---|---|---|---|---|---|---|---|
| 4,5,6 | 0 | 0:06:00 | 0:14:00 | ... | 1:00:00 | 1:17:00 | ... | 23:38:00 | 23:58:00 |
| 32 | 1 | 0:02:00 | 0:22:00 | ... | 1:02:00 | 1:22:00 | ... | 23:50:00 | 24:00:00 |
| 2,3 | 2 | 0:25:00 | 0:55:00 | ... | 3:24:00 | 3:34:00 | ... | 23:32:00 | 23:57:00 |
| : | : | : | : | ... | : | : | ... | : | : |
| 0 | 31 | 4:50:00 | 4:57:00 | ... | 14:29:00 | 14:49:00 | ... | 23:55:00 | 24:00:00 |
| 1 | 31 | 1:30:00 | 1:45:00 | ... | 10:05:00 | 10:35:00 | ... | 23:45:00 | 24:00:00 |
| : | : | : | : | ... | : | : | ... | : | : |
| 255 | 63 | 0:50:00 | 1:12:00 | ... | 12:03:00 | 12:18:00 | ... | 23:27:00 | 23:57:00 |

280: RAID GR. NUMBER-PHYSICAL LOCATION MAPPING

| RAID GR. NUMBER | PHYSICAL LOCATION |
|---|---|
| 0 | (a, 1) |
| 1 | (b, 1) |
| 2 | (c, 1) |
| 3 | (d, 1) |
| 4 | (e, 1) |
| ⋮ | ⋮ |
| 12 | (e, 2) |
| 13 | (f, 2) |
| 14 | (g, 2) |
| 15 | (h, 2) |

FIG.15

285: SIMULTANEOUS RUNNING RAID GR.-
         COMPUTER COMBINATION MAPPING

| COMBINATION OF COMPUTERS | SIMULTANEOUS RUNNING RAID GR. NUMBER | NUMBER OF SIMULTANEOUS RUNNING RAID GROUPS | RAID GROUPS BEYOND UPPER LIMIT |
|---|---|---|---|
| 1 | 0 | 1 | N |
| 2 | 1,3,4,7 | 4 | N |
| 3 | 2 | 1 | N |
| 4 | 11,13 | 2 | N |
| 5 | 21,22,24 | 3 | N |
| : | : | : | : |
| 3,4 | 2,11,13 | 3 | N |
| 3,5 | 2,21,22,24 | 4 | Y |
| 3,6 | 2,8,9,10,15,16 | 6 | N |
| 3,7 | 2,32,43,44,45,46,48,49 | 8 | N |
| : | : | : | : |
| 1,23,40 | 0,56,57,58,59,60,81,82 | 8 | Y |
| 1,23,41 | 0,102,127 | 3 | N |

COMPUTER APPARATUS, STORAGE APPARATUS, SYSTEM MANAGEMENT APPARATUS, AND HARD DISK UNIT POWER SUPPLY CONTROLLING METHOD

The present application is based on and claims priority of Japanese patent application No. 2005-288142 filed on Sep. 30, 2005, the entire contents of which are hereby incorporated by reference.

BACKGROUND OF THE INVENTION

1. Field of the Invention

The present invention relates to a storage apparatus system (hereinafter also referred to as a "storage system") for storing data of a computer (hereinafter also referred to as a "server"). In particular, the present invention relates to a storage apparatus composed of a plurality of hard disk units and a technique of controlling a power supply of the plurality of hard disk units.

2. Description of the Related Art

In recent years, various kinds of companies have found it necessary to save all business documents or electronic mail in a storage system under various laws and regulations, and in addition, to enable prompt accesses to the stored data as needed.

A tape device that has been hitherto used as data storing means for storing a large volume of data no longer satisfies a desire to allow prompt accesses to the stored data. Meanwhile, the tape device encounters a problem in that high fault rates occur and there is a significant risk that data is lost or stolen during the conveyance of a tape medium.

On the other hand, a hard disk having a SATA (serial advanced technology attachment) interface has been put into widespread use as a hard disk for a laptop personal computer, which is noted as an inexpensive hard disk compared to a hard disk using a fibre channel interface. Such a hard disk is loaded in place of the hard disk using the fibre channel interface as a recording medium of the storage system, so a low-cost large-capacity storage system can be provided.

With this as a backdrop, a large-capacity storage system equipped with several hundreds to one thousand SATA hard disk units has come into widespread use as the large-capacity data storage means in place of the tape device.

However, the large-capacity storage system that has come into widespread use instead of the tape device is inferior to the tape device in power consumption. The power saving of the apparatus leads to reduction in operating cost of the entire system, resulting in reduction of TCO (total cost of ownership) of the entire system. Some recent reports reveal that the storage system consumes about 20 to 30% of the power in a data center, so how to save the power used for the apparatus becomes one of the biggest challenges for the future.

As a method for solving the above problems, Japanese Unexamined Patent Application Publication No. Hei 09-282057 discloses a technique of controlling on/off states of a power supply of an apparatus. This technique controls the on/off states of the power supply of a peripheral device connected to a computer on the basis of the plan to execute a job on the computer and the way to execute the job.

Further, as another method for solving the above problems, U.S. Pat. No. 7,035,972 and Japanese Unexamined Patent Application Publication No. 2000-293314 disclose a technique of controlling on/off states of a power supply of a hard disk loaded in a storage system. The technique of U.S. Pat. No. 7,035,972 controls the power supply on the basis of hard disk in a hard disk group constituting a RAID. Further, in a product manufactured with this technique, the number of hard disks running at a time is reduced to ¼ or less of the loaded hard disks. The technique of Japanese Patent Application Laid-open No. 2000-293314 turns off or saves the power of a power supply of a hard disk of a hard disk group constituting a RAID, which is not accessed.

As the power saving method for the storage system, the related art of Japanese Unexamined Patent Application Publication No. Hei 09-282057 only controls the on/off states of the power supply of the entire apparatus, and there is no description about details of the power supply control such as the on/off control of the power supply of the individual hard disks loaded in the apparatus. This leads to a problem in that it is difficult to respond to an access request from a computer without delay and a power-saving effect is not so large. There is no description about how to prevent the loss of reliability of the individual hard disks due to the repeated on/off operations of the power supply.

The related art of U.S. Pat. No. 7,035,972 has a problem in that even when the requisite number of operating hard disks is less than ¼ of the loaded hard disks, it is impossible to expect a power-saving effect as high as an effect attained when the number of operating hard disks is far less than ¼ of the loaded hard disks. In addition, several hard disks that always operate are provided for responding to the access request without delay, resulting in the increase in power consumption.

The related art of Japanese Unexamined Patent Application Publication No. 2000-293314 is such a passive power supply controlling method that the power supply of the hard disk is turned off when there is no access. Hence, it is difficult to respond to the access request without delay. There is no description about how to prevent the loss of reliability of the individual hard disks due to the repeated on/off operations of the power supply.

SUMMARY OF THE INVENTION

The present invention has been accomplished to solve the aforementioned problems, and accordingly it is an object of the present invention to provide a computer system, including: a plurality of computers; a storage apparatus having a plurality of hard disk units and being connected to the plurality of computers; and a system management apparatus connected to the plurality of computers and the storage apparatus, the storage apparatus controlling a data write operation and a data read operation between the computers and the hard disk units, and controlling on/off states of a plurality of power supplies of the plurality of hard disk units on a group basis with the group including one or more hard disk units, and the system management apparatus collecting running information about the plurality of computers and computer execution job information for each computer, and determining an on/off time of the power supplies of the plurality of hard disk units on the group basis to record the collected information and the on/off time of the power supplies on the group basis.

According to the present invention, it is possible to provide a storage apparatus capable of minimizing a performance deterioration, saving the power and prolonging the lifetime of the hard disk loaded to the apparatus to enhance the reliability of the apparatus.

BRIEF DESCRIPTION OF THE DRAWINGS

FIG. 15 shows an example of a table listing combinations of computers the number of simultaneous running RAID Gr. of which exceeds the upper limit when the computers run at a time.

DESCRIPTION OF THE PREFERRED EMBODIMENTS

Hereinafter, the best modes for carrying out the invention will be described.

A computer system, a storage apparatus, a system management apparatus, and a hard disk unit power supply controlling method according to embodiments of the present invention are described with reference to the accompanying drawings.

First Embodiment

Figure 1:
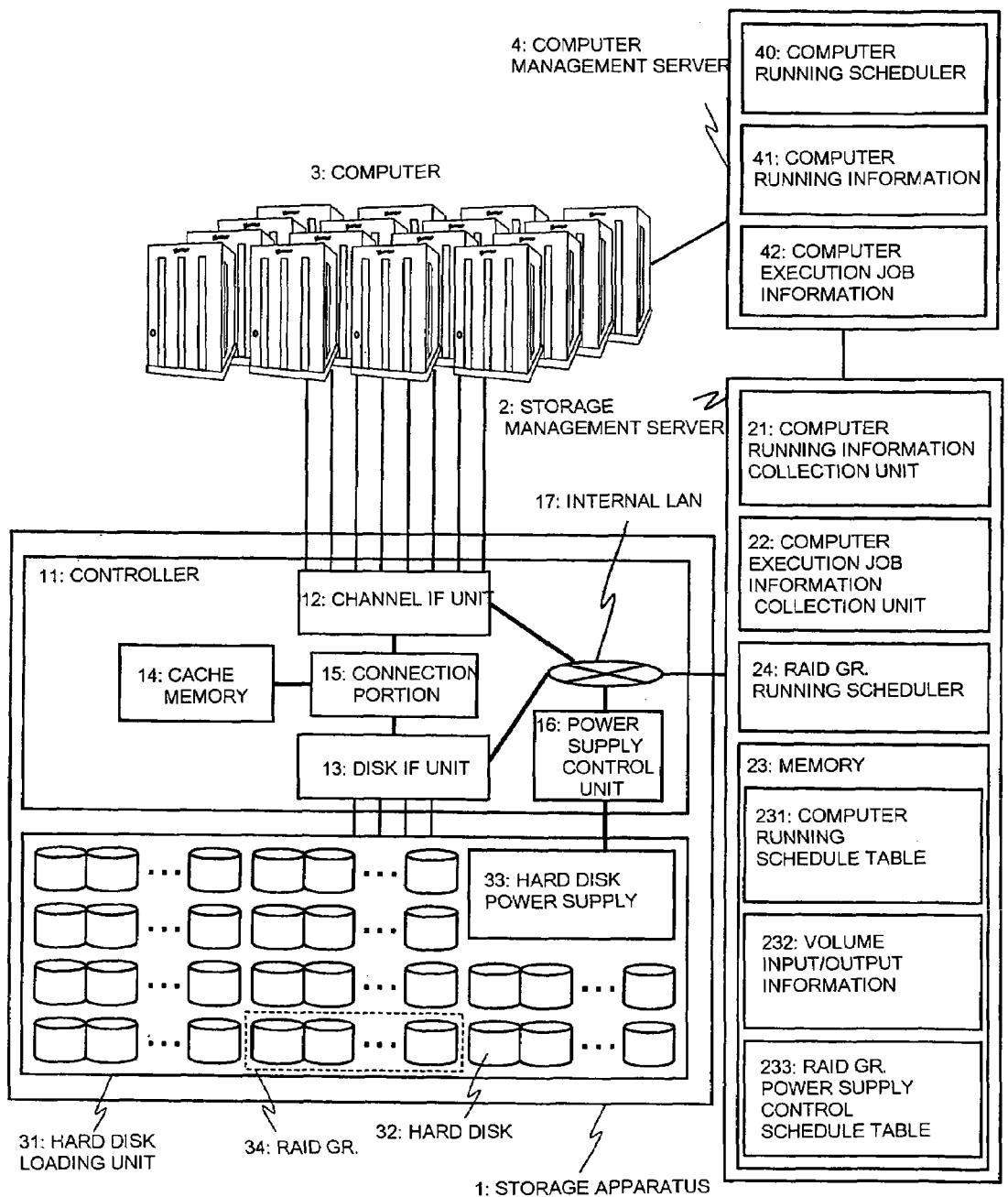
FIG. 1 shows a configuration example of a storage apparatus, and a computer apparatus and a management server connected to the storage apparatus according to an embodiment of the present invention.

A first embodiment of the present invention is described below. FIG. 1 shows a configuration example of a system including a storage apparatus according to the first embodiment of the present invention. The system includes a storage apparatus 1, a storage management server 2, a computer 3, and a computer management server 4. The storage management server 2 and the computer management server 4 constitute a system management apparatus. As shown in FIG. 1, the storage apparatus 1 and the computer 3 are directly connected but may be connected through a switch. One or more computers 3 may be provided and composed of a plurality of virtual machines.

The storage apparatus 1 includes a controller 11 and a hard disk loading unit (hard disk unit) 31. The controller 11 includes a channel IF (interface) unit 12 connected to the computer 3 to control data write/read accesses from the computer 3, a disk IF (interface) unit 13 connected with a plurality of hard disks 32 to control data write/read accesses to the hard disks 32, a cache memory 14 temporarily storing write/read data with respect to the hard disks 32, and a connection portion connecting among the channel IF unit 12, the disk IF unit 13, and the cache memory 14. The connection portion 15 is generally composed of a plurality of switches but may be composed of several common bus lines.

The channel IF unit 12 controls the data transfer from/to the cache memory 14 in response to the data write/read access from the computer 3. The disk IF unit 13 controls the data transfer from/to the cache memory 14 upon writing/reading the data to/from the hard disks 32. Due to such data exchange of the channel IF unit 12 and the disk IF unit 13 through the cache memory 14, the computer 3 writes/reads data to the hard disk 14. In order to execute such control, the channel IF unit 12 and the disk IF unit 13 include one or more processors (not shown). The processors are connected with an internal LAN 17. Further, a storage management server 2 provided outside the storage apparatus is connected to the internal LAN 17.

Here, the configuration of the above controller 11 is illustrated by way of example, and the configuration is not limited to the above one. The controller 11 may have any configuration insofar as a function of writing/reading data to/from the hard disks 32 can be executed.

The controller 11 further includes a power supply control unit 16 for controlling on/off (power-on, power-off) states of the power supply of the hard disks 32. The power supply control unit 16 is connected to the internal LAN 17.

The hard disk loading unit 31 includes the plurality of hard disks 32 and a hard disk power supply 33 for supplying power to the individual hard disks 32. The plurality of hard disks 32 are grouped into a RAID group (Gr.). Here, for example, one or two (in the case of redundant configuration) hard disk power supplies 33 may be provided for each hard disk 32 or RAID Gr.

The power supply control unit 16 of the controller 11 is connected to the hard disk power supply 33 to control the on/off states of the power supply. Here, the power supply control unit 16 may be provided inside the hard disk loading unit 31, not inside the controller 11. Further, the power supply control unit 16 may be directly connected to the storage management server 2.

The computer management server 4 includes a computer running scheduler 40 for determining a start time and stop time for each computer, computer running information summarizing the computer start time and stop time for each computer, and computer execution job information 42 serving as information about a job executed on each computer. The jobs are independent of each other, so the processings executed by a plurality of computers may be referred to as a job.

The storage management server 2 includes a computer running information collection unit 21 for collecting computer running information 41 from the computer management server 4, a computer execution job information collection unit 22 for collecting the computer execution job information 42, a RAID Gr. running scheduler 24 for scheduling the on/off time of the power supply for each RAID Gr., and a memory 23 for storing a computer running schedule table 231 created on the basis of the computer running information 41 collected from the computer management server 4, volume input/output information 232 created on the basis of the computer execution job information 42, and a RAID Gr. power supply control schedule table 233 created with the RAID Gr. running scheduler 24 on the basis of the computer running schedule table 231 and the volume input/output information 232.

The power supply control unit 16 receives the RAID Gr. power supply control schedule table 233 from the storage management server 2 to control the hard disk power supply 33 in accordance with the schedule of the table.

Figure 2:
FIG. 2 shows an example of a computer running schedule table.

FIG. 2 shows an example of the computer running schedule table 231. The computer running information collection unit 21 collects the start time and stop time for each computer from the computer management server 4 to create a table listing the start time (Start) and stop time (Stop) of each computer as shown in the figure. Alternatively, the start time and run time of each computer may be collected from the computer management server 4 to derive the stop time based on the start time and the run time.

Here, the format of the computer running schedule table 231 of FIG. 2 is illustrated by way of example, and the format is not limited to the above one. Any format can be used as long as the start time and stop time of each computer 3 can be known.

Figure 3:
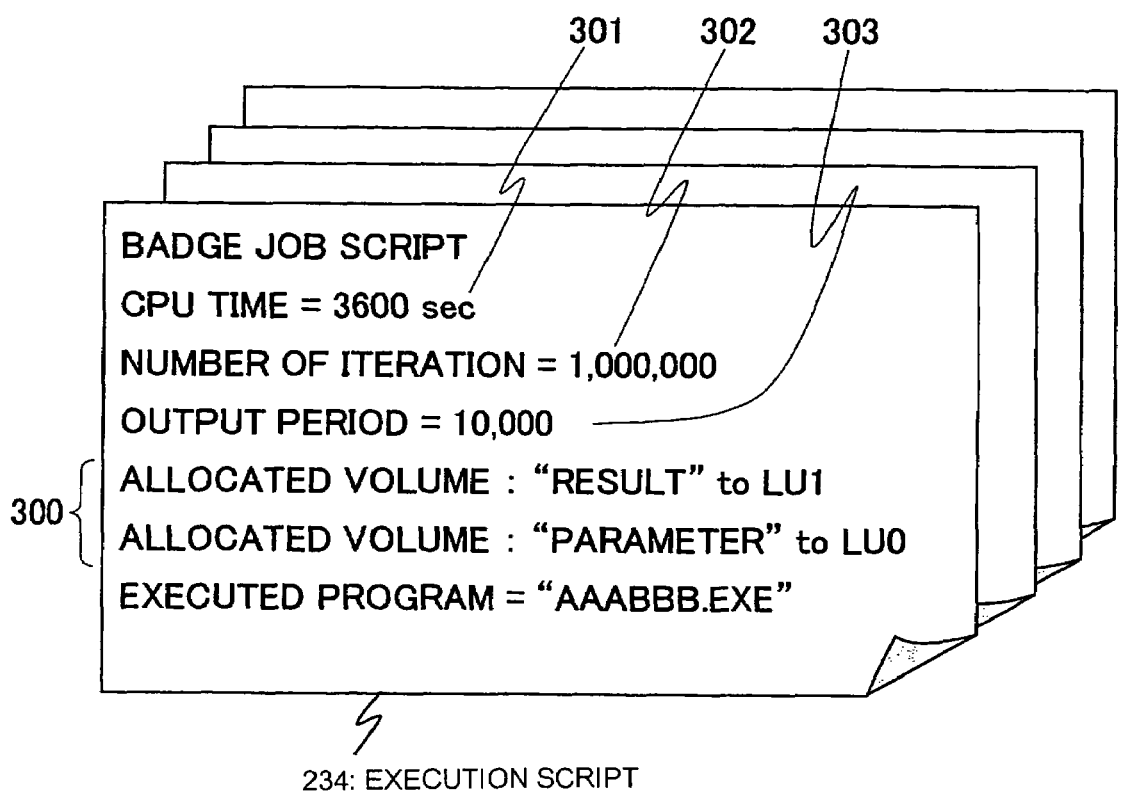
FIG. 3 shows an example of an execution script.

FIG. 3 shows an example of an execution script 234 that describes information about an execution job (or calculation) to be executed on each computer 3. The execution script 234 is input with a terminal (not shown) connected with the computer management server 4 by a user who executes computation using the computers 3 and stored in the computer execution job information 42. The execution script 234 is provided for each computer 3, and in the illustrated example, a plurality of execution scripts are provided. In order to draw up the power supply control schedule of the hard disk 32 on the storage apparatus 1, the execution script 234 includes information 300 about a logical volume (LU) for storing at least a computation parameter or computation result.

Further, a run time (CPU TIME) 301, an execution repetitive number 302, and a repetitive number in an interval 303 for outputting the computation result are preferably provided. Such information enable finer power supply control of the hard disks 32.

Here, the format of the execution script of FIG. 3 is illustrated by way of example, and the format is not limited to that of FIG. 3. Any format may be used as far as at least the above information is included.

Figure 4:
FIG. 4 shows a mapping example between volumes allocated to a computer and RAID Gr.

FIG. 4 shows an example of a computer-volume (LU)-RAID Gr. mapping 235 indicative of mapping between the logical volume (LU) allocated to a computer and RAID Gr. to which the logical volume belongs. The storage management server 2 includes a mapping table illustrative of mapping between the logical volume, which is provided to the computer by the storage apparatus 1, and the RAID Gr. One or more logical volumes are allocated to each computer 3. Upon executing some computation, the computer 3 uses not all the allocated logical volumes. Therefore, the computer execution job information collection unit 22 extracts logical volume information used by each computer for the computation from the execution script 234 collected from the computer management server 4 to create the computer-volume (LU)-RAID Gr. mapping 235.

In the computer-volume (LU)-RAID Gr. mapping 235 of FIG. 4, an item indicating whether or not each logical volume is used for computation may be added to define the computer-volume (LU)-RAID Gr. mapping for all the logical volumes allocated to the computer 3. Thus, a table showing whether or not each logical unit is used for computation may be created.

Figure 5:
FIG. 5 shows an example of a RAID Gr. power supply control schedule table.

FIG. 5 shows an example of the RAID Gr. power supply control schedule table 233. The RAID Gr. running scheduler 24 creates a table showing the power-on time (power ON) and power-off time (power OFF) for each RAID Gr. on the basis of the computer running information 41 collected with the computer running information collection unit 21 and the computer execution job information 42 collected with the computer execution job information collection unit 22.

Here, the format of the RAID Gr. power supply control schedule table 233 is illustrated by way of example, and the format is not limited to the above format of FIG. 5. Any format can be used as long as the power-on time and the power-off time can be known for each RAID Gr.

Figure 6:
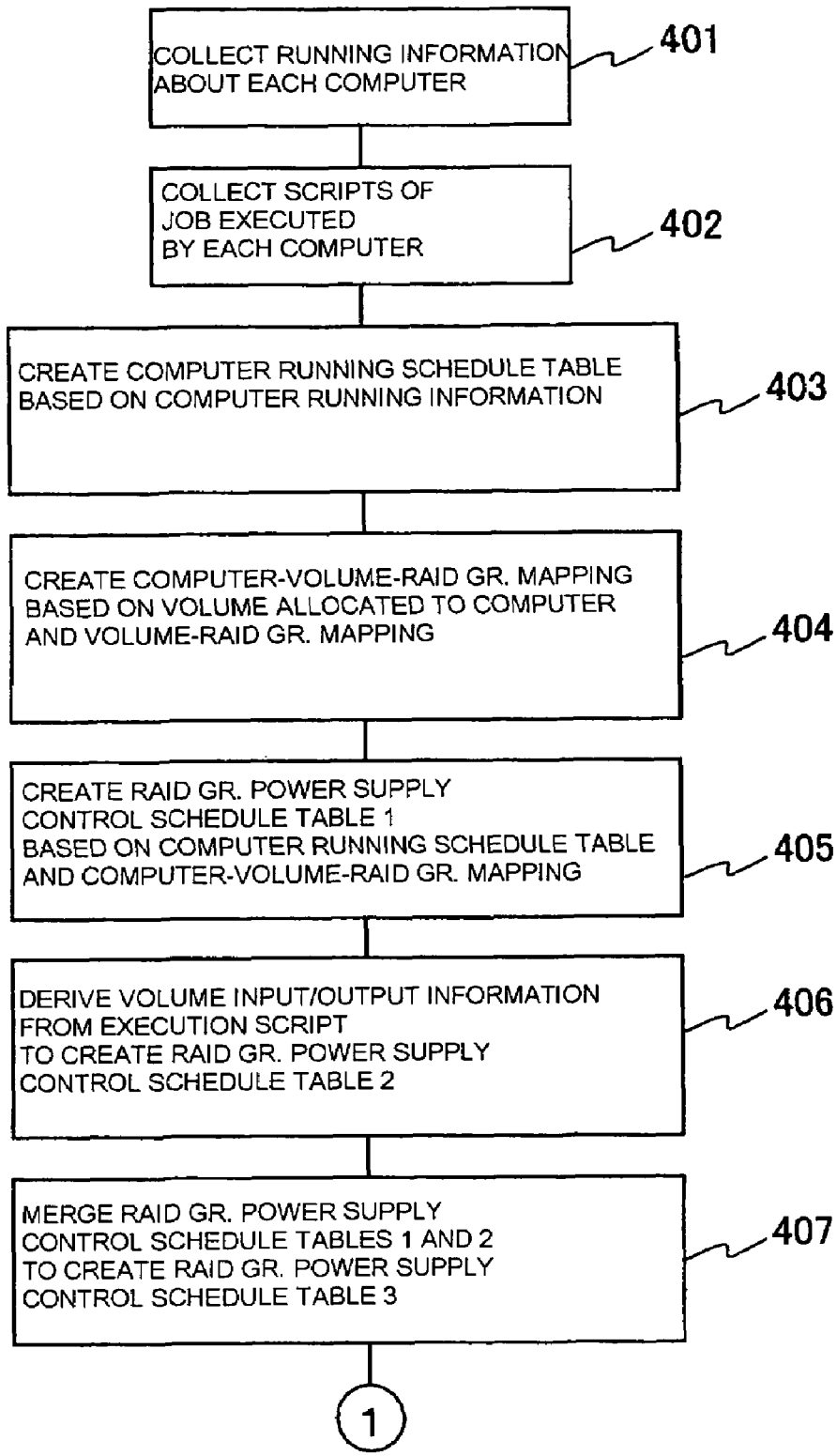
FIG. 6 is a flowchart illustrative of an example of a procedure for creating the RAID Gr. power supply control schedule table.

FIG. 6 is a flowchart illustrative of an example of a procedure for creating the RAID Gr. power supply control schedule table 233 in the storage management server 2. First, the computer running information collection unit 21 collects the computer running information 41 as running information of each computer 3 from the computer management server 4 (401). The computer execution job information collection unit 22 collects the execution script 234 from the computer management server 4 as the computer execution job information 42 (402). The computer running information collection unit 21 creates the computer running schedule table 231 on the basis of the collected computer running information 41 to store the created table in the memory 23 (403). If the computer running information 41 includes a table similar to the computer running schedule table 231, the table may be used as it is. The computer execution job information collection unit 22 extracts from the collected execution script 234 the logical volume 300 used for the computation to create the computer-volume (LU)-RAID Gr. mapping 235 on the basis of the relation between the logical volume and the RAID Gr, which is in the storage management server 2. (404).

Next, a RAID Gr. power supply control schedule table 1 (233) is created on the basis of the logical volume allocated to each computer, the RAID Gr. to which the logical volume belongs, and the start time and stop time of each computer derived from the computer running schedule table 231 (405).

Hereinbelow, a description is made of an example of the way to determine the on/off time of the RAID Gr. power supply necessary for creating the power supply control schedule table 1 (233). For reading data necessary for the computation from the allocated logical volume at the start of running the computer, the logical volume needs to be in an operating state. Then, for writing the computation result to the allocated volume at the end of running, the logical volume needs to be in an operating state. The operating period of the logical volume should be set not shorter than a period necessary for the computer to read data and not shorter than a period necessary for the computer to write the data. The amount of read/write data varies depending on the conditions for the executed computation, but never exceeds the capacity of the logical volume to/from which the data is written/read. Hence, the logical volume operating period for the data write or read is set to the sum of a period necessary for reading or writing data corresponding to the capacity of the logical volume and a period set as a margin that is calculated at a given rate (for example, about 10% of the total period).

Here, the size of the data read from the logical volume at the start of computation and the size of the data written to the logical volume at the end of completion are described in the execution script 234, making it possible to more accurately determine the logical volume operating period.

The data read or write speed can be derived as an average value from the performance records of the storage apparatus, making it possible to calculate a period necessary for reading data at the start of computation and a period necessary for writing data at the end of computation on the basis of the average speeds and the volume capacity with the use of the aforementioned method.

After the power-on of the hard disk, it takes several minutes to allow the data read/write. Thus, it is necessary to turn on the power supply of the hard disk several minutes before the start time or stop time. Therefore, the start time of the data reading logical volume allocated to any computer is several minutes ahead of the start time of the computer (requisite period from the power-on of the hard disk until when the read operation is allowed). The logical volume operation stop time is set to a time after the time necessary for reading data that is determined with the above method. Further, if the computation starts after all the data have been read, the logical volume may operate as early as the above-mentioned several minutes plus the time necessary for reading data. In this case, the logical volume operation stop time may be set to the start time or set several minutes behind the start time with time to spare. Likewise, the operating start time for the data writing logical volume allocated to any computer is set several minutes ahead of the stop time of the computer (period from the power-on of the power supply of the hard disk until when the data write is allowed). The logical volume operation stop time is set to a time after the time necessary for writing data that is determined with the above method, from the stop time of the computer. Here, if the data reading logical volume and the data writing logical volume are the same, needless to say, the time calculated with the above method upon the data reading/ writing may be set to the logical volume operating start time and stop time.

In this way, a pair of operating start time and stop time are calculated for all the logical volumes used by the computer 3 for the calculation (needless to say, there are a number of pairs). The relation between the logical volumes and the RAID Gr. can be known on the basis of the computer-volume (LU)-RAID Gr. mapping 235. Hence, the power supply on/off time of the RAID Gr. necessary for creating the RAID Gr. power supply control schedule table 1 (233) can be determined based on the pairs of operating start time and stop time for all the logical volumes used by the computer 3 for the computation.

Next, the run time 301, the execution repetitive number 302, and the repetitive execution interval 303 for outputting the computation result are extracted from the execution script 234 to calculate the calculation result output time to the RAID Gr. to which the logical volume allocated to a computer belongs on the basis of the extracted information to create the RAID Gr. power supply control schedule table 2 (233) (406).

Hereinbelow, a description is made of an example of the way to determine the on/off time of the RAID Gr. power supply of the RAID Gr. necessary for creating the RAID Gr. power supply control schedule table 2 (233). The time necessary for one computation cycle can be derived from the run time 301 and the execution repetitive number 302 extracted from the execution script 234. Further, the time interval for outputting the computation result can be derived from the time necessary for one computation cycle and the repetitive number in an interval 303 for outputting the computation result. It is possible to determine the operating start time and stop time of the logical volume to which the intermediate computation result is output on the basis of the time interval for outputting the computation result.

The logical volume is made to operate at the time intervals for outputting the computation result from the start time of the computer. Further, it is possible to determine the logical volume operating period similar to the method described in the section about the way to determine the power supply on/off time of the RAID Gr. necessary for creating the RAID Gr. power supply control schedule table 1 (233). Further, it takes several minutes to allow the data reading/writing from the power-on of the power supply of the hard disk. Hence, the power supply of the hard disk should be turned on several minutes ahead of the computation result output time. Based on these, the operating start time and stop time of the logical volume to which the intermediate computation result is output can be determined.

In this way, a pair of operating start time and stop time are calculated for all the logical volumes to which the intermediate computation result is output by use of the computer 3 (needless to say, there are various pairs). The relation between the volume (LU) and RAID Gr. can be known on the basis of the computer-volume (LU)-RAID Gr. mapping 235. Hence, the power supply on/off time of the RAID Gr. necessary for creating the RAID Gr. power supply control schedule table 2 (233) can be determined based on the pairs of operating start time and stop time for all the logical volumes to which the intermediate computation result is output.

Next, the RAID Gr. power supply control schedule table 1 (233) is combined with the RAID Gr. power supply control schedule table 2 (233) to create a RAID Gr. power supply control schedule table 3 (233) (407). In combining the two tables, needless to say, portions of tables 1 and 2 where the power-on times overlap for all the logical volumes used for computation need to be combined, and the power-on time and the power-off time should be adjusted.

Herein, the RAID Gr. power supply control schedule is predicted and determined as mentioned above, but the input/ output time of the data to/from the computer 3 may be shifted from the predicted time. In order to allow the data input/ output even in such a case, the storage apparatus 1 has the following function.

In the case where the data input/output time is moved ahead of the predicted time, and the power supply of the corresponding RAID Gr. is turned off, an instruction to stop and wait the data writing/reading is issued to the computer 3. If the data input/output time is delayed from the predicted time, the power supply is kept on until the data input/output is completed instead of turning off the power supply of the RAID Gr. at the predicted time. At this time, if the next power-on time of the RAID Gr. is passed, the power supply is kept on until the power supply off time corresponding to the power supply on time.

Further, if the data input/output time is moved ahead of the predicted time, the power supply of the RAID Gr. is turned off, and the data writing operation is executed, the following control can be executed. That is, if a capacity of a temporarily storable area in the cache memory 14 of the storage apparatus 1 is larger than the amount of data written during the activation period of the hard disk, the data write request is accepted; otherwise, the computer 3 is instructed to stop and wait the data writing.

According to this embodiment, the power supply of the hard disk composing the RAID Gr. to which a logical volume belongs can be turned on in accordance with the data input/ output time for the logical volume of the storage apparatus 1 allocated to the computer 3, and the power supply of the hard disk can be turned off in accordance with the data input/ output stop time. Hence, the input/output performance deterioration of the storage apparatus 1 can be minimized, and the power consumption of the apparatus can be reduced.

This embodiment describes the case where the power on/off states of the hard disk 32 are controlled to save the power consumption of the storage apparatus 1. However, it is also possible to use the hard disks 32 operable with various rotational speeds as a data storage medium. In this case, the power supply control unit 16 has a function of controlling the rotational speed as well as the on/off states of the power supply.

The use of the hard disks 32 operable with various rotational speeds realizes more efficient power saving with less deterioration in performance than the case of executing only the on/off control.

Figure 7:
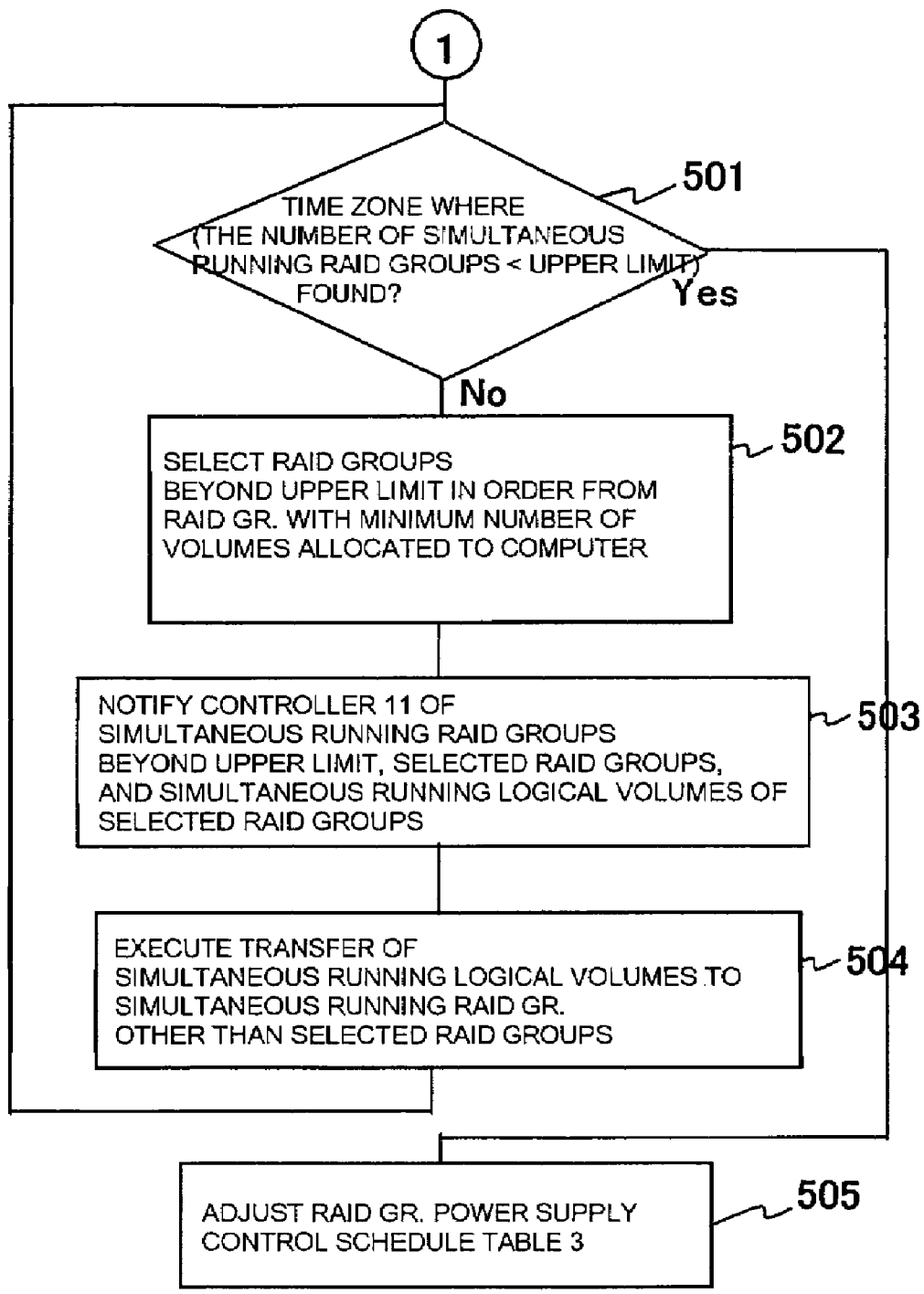
FIG. 7 is a flowchart illustrative of an example of a procedure for setting limits on the number of simultaneous running RAID Gr. during the creation of the RAID Gr. power supply control schedule table.

FIG. 7 shows an example of a method for further reducing power consumption in the storage apparatus 1 of this embodiment. The RAID Gr. power supply control schedule table 233 is first created in accordance with the procedure illustrated in FIG. 6.

Next, the time zone where the number of simultaneous running RAID Gr. exceeds an upper limit is retrieved from the RAID Gr. power supply control schedule table 233 (501).

If there is a time zone where the number exceeds the upper limit, a number of RAID Gr. exceeding the upper limit of the predetermined number of simultaneous running RAID Gr. are selected. The selection is performed in order from the RAID Gr. with the minimum number of simultaneous operating logical volumes out of the target simultaneous running RAID Gr. (502). Herein, the selection method is given by way of example, and the present invention is not limited to this method.

Next, the controller 11 is notified of the simultaneous running RAID Gr. concerned, the selected simultaneous running RAID Gr. beyond the upper limit of the predetermined number of simultaneous running RAID Gr., and the simultaneous operating logical volumes of the selected RAID Gr. (503).

The notified controller 11 reallocates the simultaneous operating logical volumes of the selected RAID Gr. informed by the storage management server 2 to the simultaneous running RAID Gr. other than the selected RAID Gr. to transfer the data in the reallocated logical volumes to the RAID Gr. having been designated as the reallocation destination. (504).

After that, the processing returns to step 502 to repeat steps 502 to 504 until it is confirmed that there is no time zone where the number of simultaneous running RAID Gr. exceeds the upper limit.

Then, if it is confirmed that there is no time zone where the number of simultaneous running RAID Gr. exceeds the upper limit, the RAID Gr. power supply control schedule table 233 is corrected on the basis of the information about the relocated logical volume (505).

If there still remains the time zone where the number of simultaneous running RAID Gr. exceeds the upper limit, the repeating of steps 502 to 504 is stopped at the time when a difference between the number of simultaneous running RAID Gr. and the upper limit is minimized.

According to the above method, the number of simultaneous running RAID Gr. can be set to a predetermined value or less, so the power consumption can be saved more than the case where the number of simultaneous running RAID Gr. is not limited.

Figure 8:
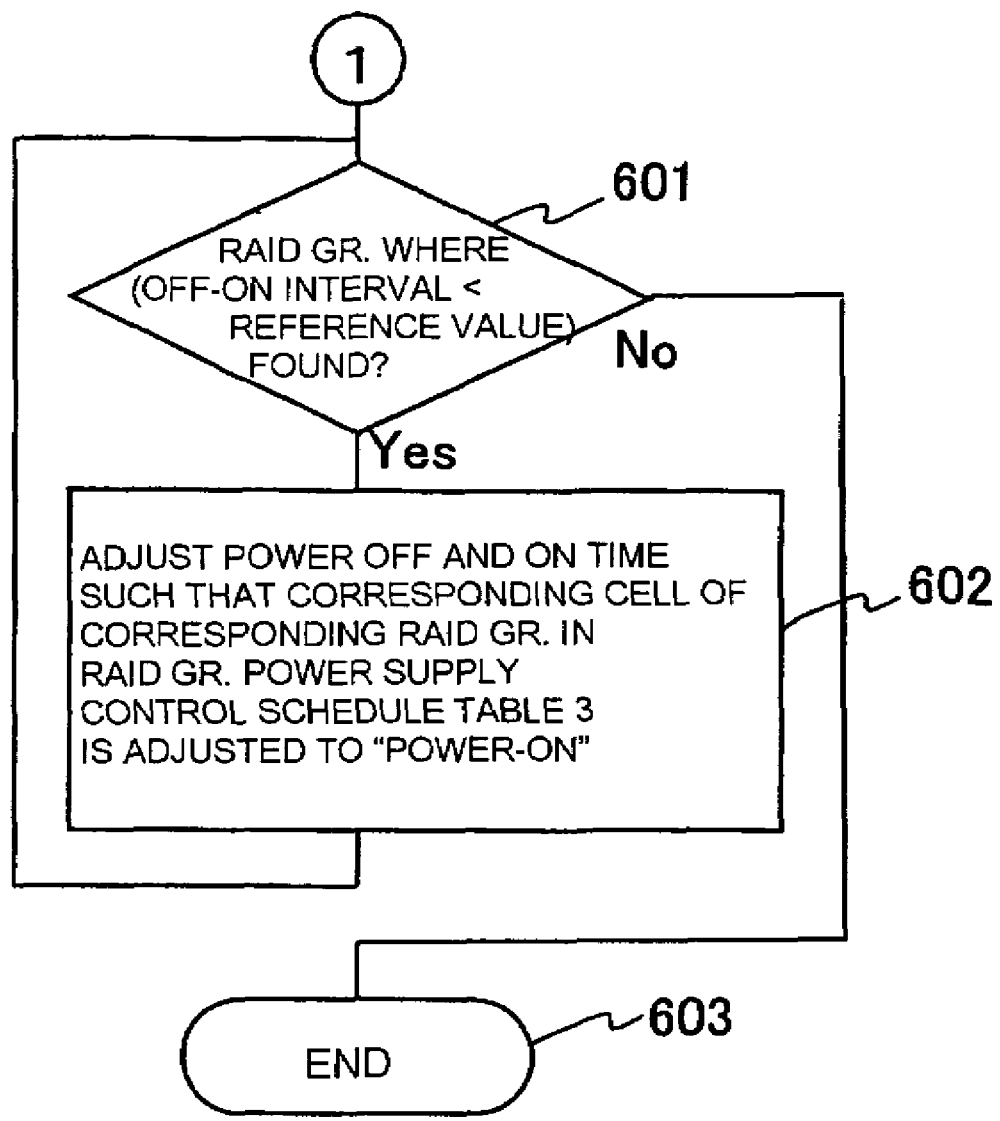
FIG. 8 is a flowchart illustrative of an example of a procedure for setting limits for improving the performance during the creation of the RAID Gr. power supply control schedule table.

FIG. 8 shows an example of a method of improving the data input/output performance and prolonging the lifetime of the hard disk in the storage apparatus 1 of this embodiment. The RAID Gr. power supply control schedule table 233 is first created in accordance with the procedure illustrated in FIG. 6. Next, a RAID Gr. in which a time interval from the power-off to the power-on is shorter than a predetermined period is retrieved from the RAID Gr. power supply control schedule table 233 (601).

If the RAID Gr. in which a time interval from the power-off to the power-on is shorter than a predetermined period is found, the power-off time and subsequent power-on time of the RAID Gr. are deleted from the portion corresponding to the time interval of the RAID Gr. in the RAID Gr. power supply control schedule table 233 to execute such correction that the power supply of the RAID Gr. is turned on during the corresponding time interval (602). The process of step 602 is repeated until it is confirmed that there is no RAID Gr. where the time interval from the power-off to the power-on is shorter than a predetermined period to end the processing (603).

According to the above method, it is possible to prevent the power supply of the RAID Gr. from being turned on/off more than necessary, making it possible to improve the data input/output performance, and prolong the lifetime of the hard disk.

Figure 10:
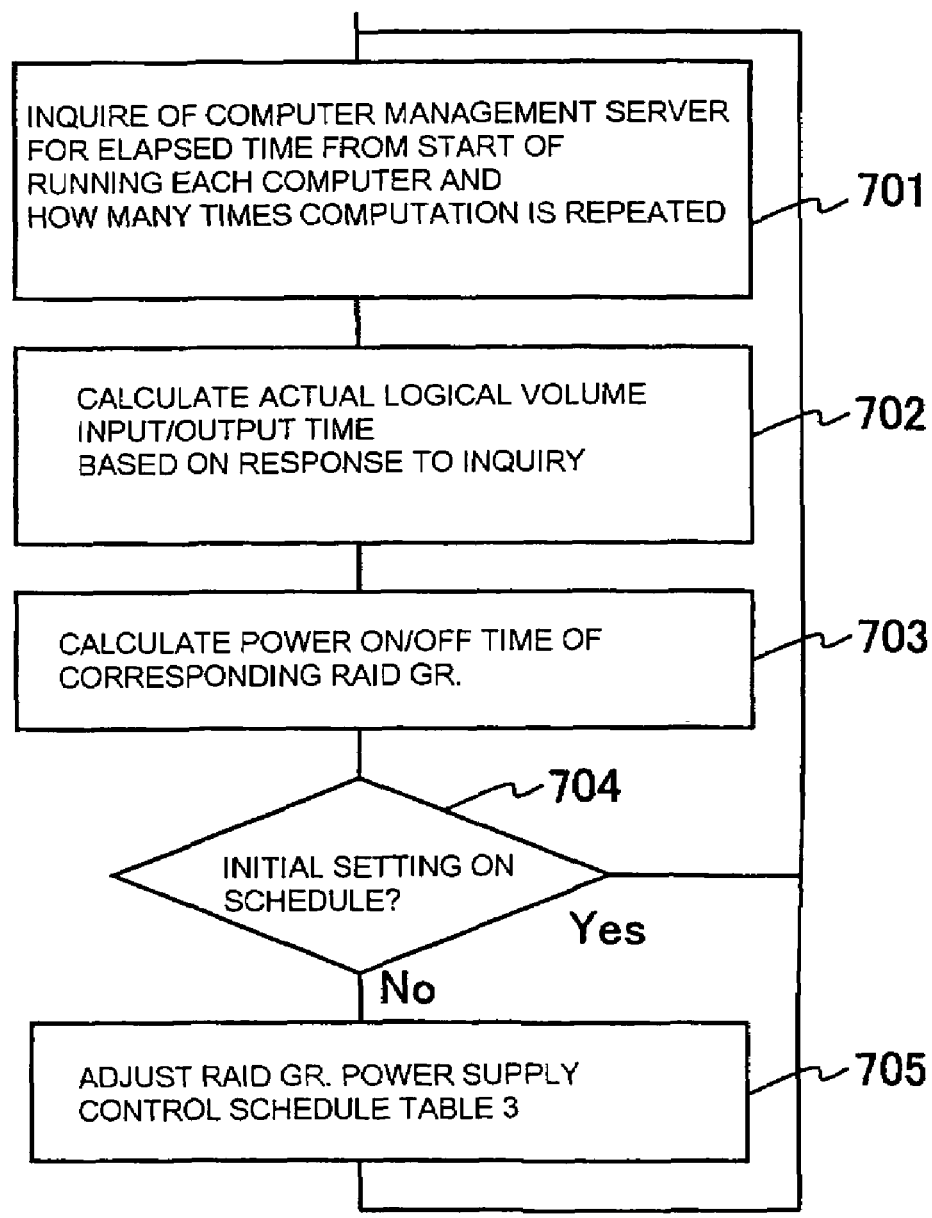
FIG. 10 is a flowchart illustrative of an example of a procedure for correcting the RAID Gr. power supply control schedule table during the running of the computer.

FIG. 10 shows an example of a method for correcting the RAID Gr. power supply control schedule table 233 during the running of the computer in the storage apparatus 1 of this embodiment.

Figure 9:
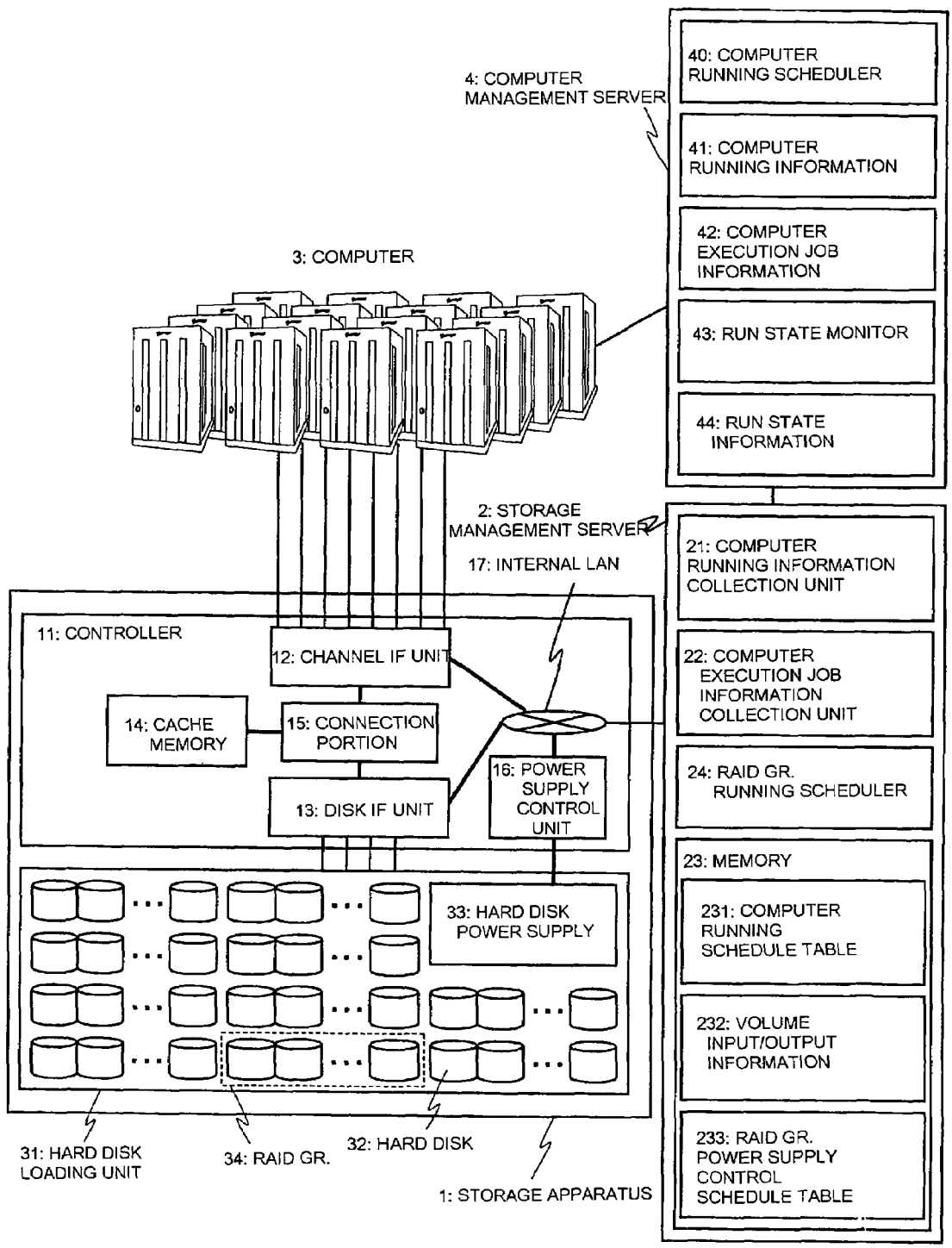
FIG. 9 shows another configuration example of the storage apparatus and the computer and management server connected to the storage apparatus.

As shown in FIG. 9, the computer management server 4 includes a running state monitor 43 for monitoring the running state of each computer and running state information 44 representing the monitoring result. The running state information 44 includes at least the elapsed time from the start time and the repetitive computation number. The running state monitor 43 periodically monitors the elapsed time from the start time and the repetitive computation number at predetermined time intervals.

As shown in FIG. 10, the computer execution job information collection unit 22 in the storage management server 2 makes an inquiry to the computer management server 4 at predetermined time intervals to thereby receive the elapsed time from the start time and the repetitive computation number from the run state information 44 (701).

Next, the computer execution job information collection unit 22 recalculates the data input/output time to/from the logical volume used by the computer for the current time and subsequent time on the basis of the elapsed time from the start time and the repetitive computation number (702). Based on the calculation result, the data input/output time of the RAID Gr. to which the logical volume used by the computer belongs is recalculated as illustrated in FIG. 6 (703).

Next, it is checked whether or not the recalculated schedule matches with the RAID Gr. power supply control schedule table 233 created upon the initial setting or a previous correction (704).

If not matched, the RAID Gr. power supply control schedule table 233 is corrected (705). If matched, the system waits for the next correction time.

According to the above method, it is possible to control the on/off states of the power supply of the RAID Gr. in sync with the actual data input/output time to/from the computer.

Figure 11:
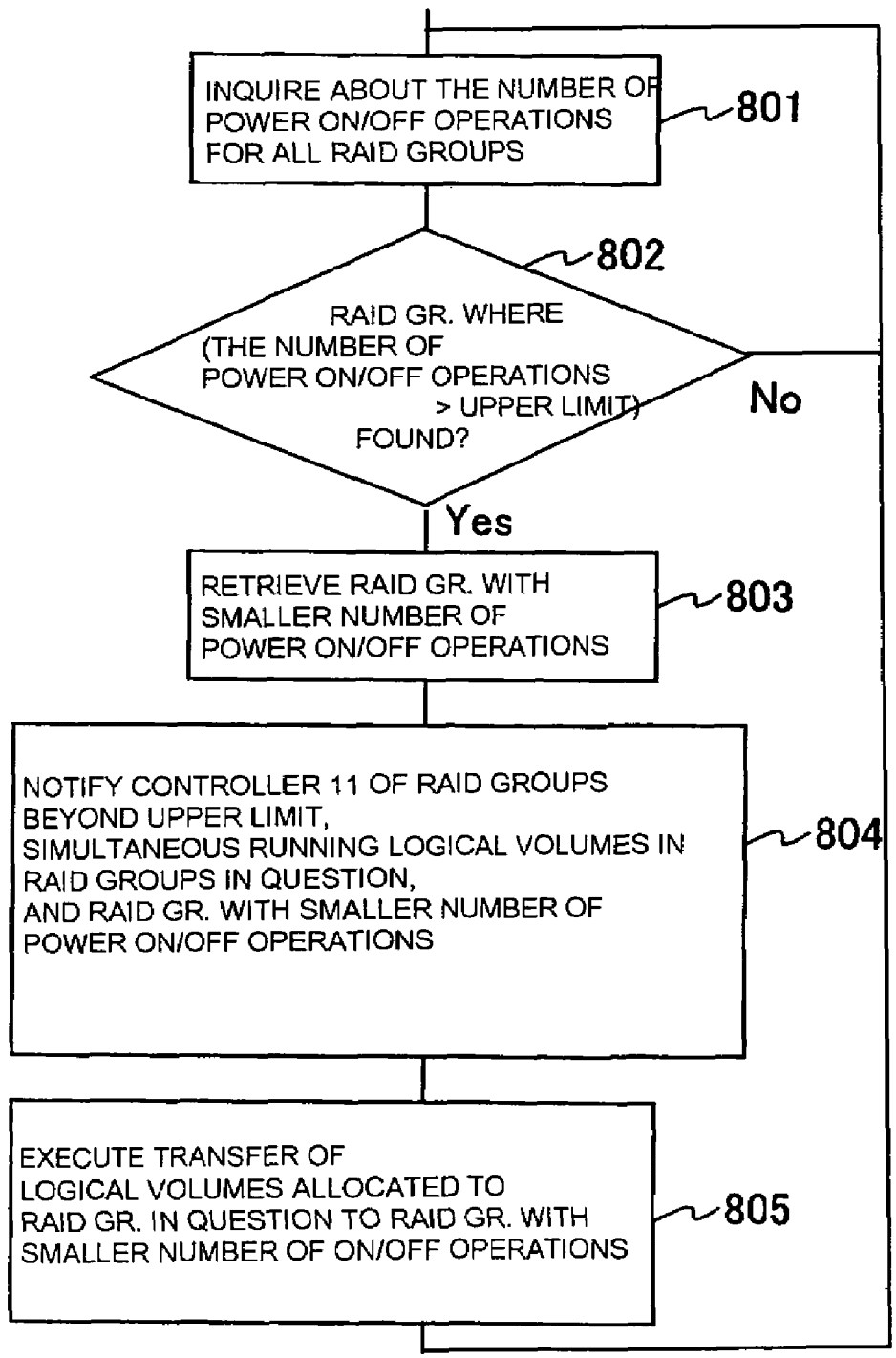
FIG. 11 is a flowchart illustrative of an example of a procedure for setting limits on the number of times the power supply of the RAID Gr. is turned on/off during the creation of the RAID Gr. power supply control schedule table.

FIG. 11 shows an example of a method for setting limits on the number of times the power supply of the RAID Gr. is turned on/off in the storage apparatus 1 of this embodiment.

The power supply control unit 16 in the controller 11 counts the number of times the power supply is turned on/off for each RAID Gr.

If the computer completes all the computations in accordance with the running schedule, and draws up the new running schedule to start the calculation, the storage management server 2 creates the RAID Gr. power supply control schedule table 233 in accordance with the procedure illustrated in FIG. 6 on the basis of the new running schedule.

Next, the RAID Gr. running scheduler 24 of the storage management server 2 receives the number of on/off operations of the power supply of all the RAID Gr. in the storage apparatus 1 from the power supply control unit 16 (801).

Next, in the RAID Gr. power supply control schedule table 233, the RAID Gr. where the number of power on/off operations during a given period exceeds a predetermined value is searched (802).

If there is found the RAID Gr. where the number of power on/off operations during a given period exceeds a predetermined value, the RAID Gr. with a smaller number of power on/off operations is searched (803). As an example of selecting the RAID Gr. with a smaller number of power on/off operations, a given number of RAID Gr. are selected in order from the RAID Gr. with the minimum number of power on/off operations. Here, the selecting method is given by way of example, and the present invention is not limited to this method.

Next, the controller 11 is notified of the corresponding RAID Gr., the simultaneous operating logical volumes in the corresponding RAID Gr., and the selected RAID Gr. with a smaller number of on/off operations (804).

Next, the controller 11 reallocates the simultaneous operating logical volumes of the corresponding RAID Gr. informed by the RAID Gr. running scheduler 24 to the selected RAID Gr. with a smaller number of on/off operations to transfer the data in the reallocated logical volumes to the RAID Gr. having been designated as the reallocation destination (805).

If there is no RAID Gr. where the number of power on/off operations exceeds a predetermined value, the system waits for the creating of the next RAID Gr. power supply control schedule table 233.

According to the above method, it is possible to prolong the lifetime of the hard disks to raise the reliability of the storage apparatus 1.

Figure 12:
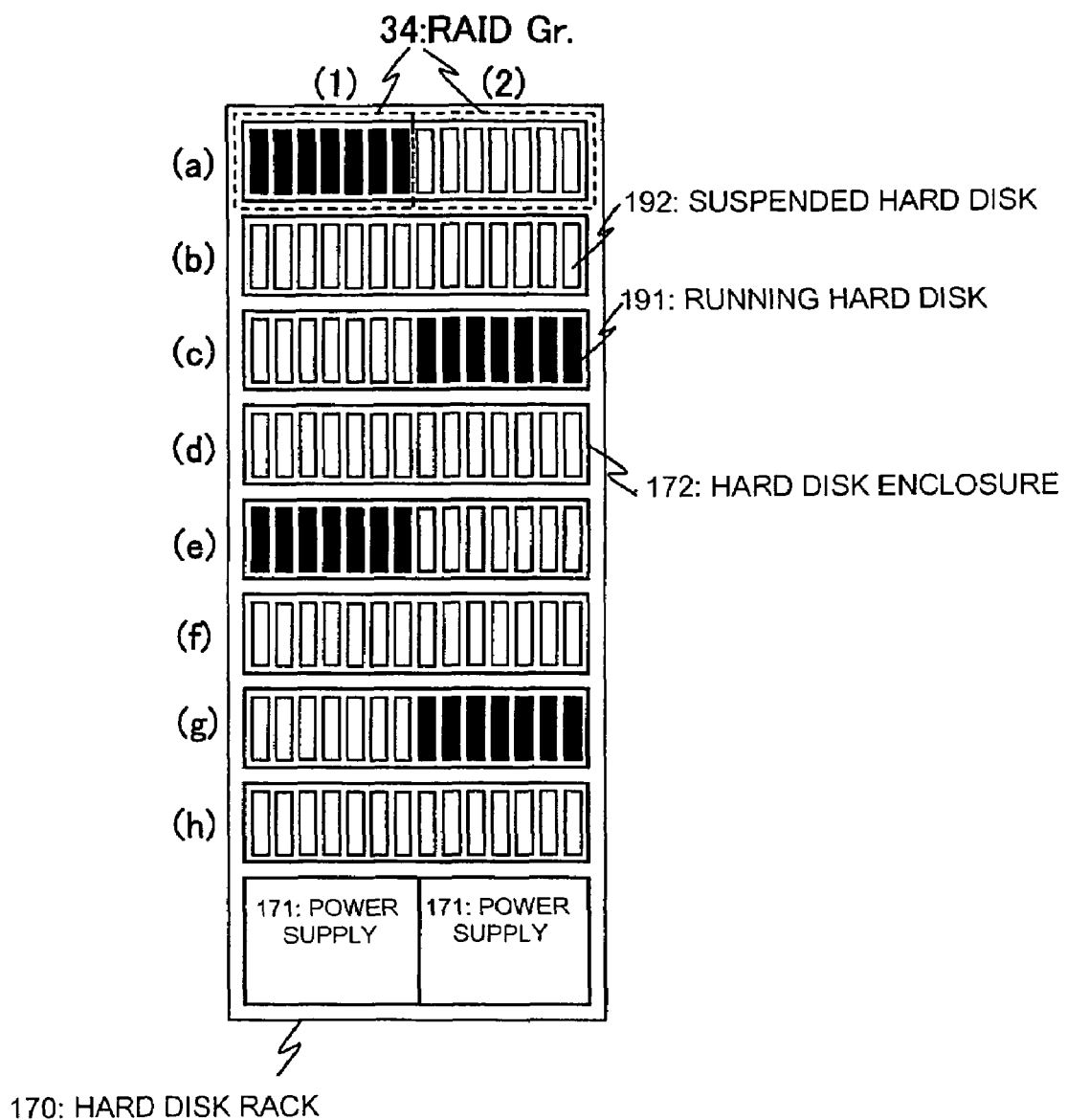
FIG. 12 shows a physical location example of the simultaneous running RAID Gr. in a hard disk rack.
Figure 13:
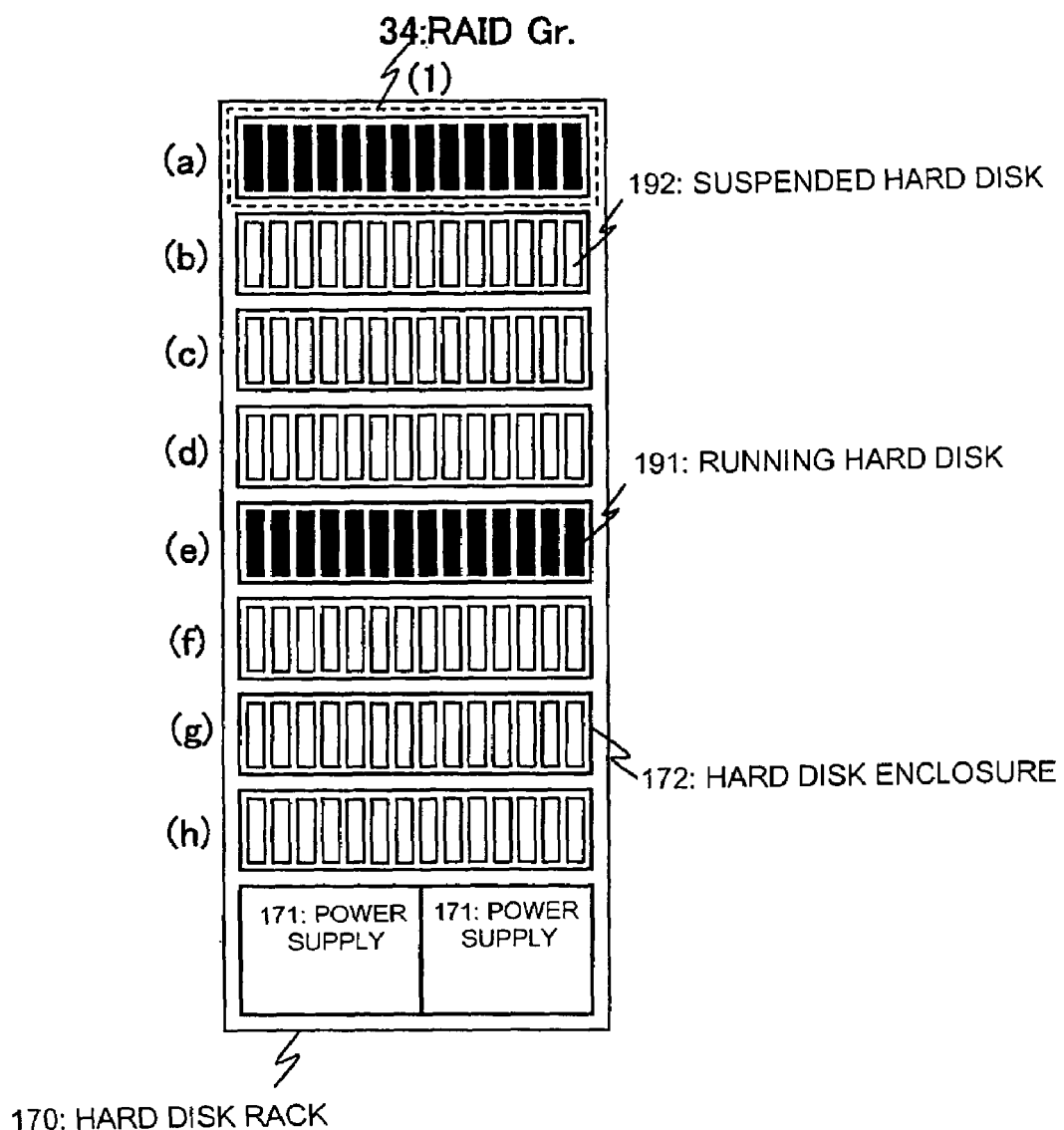
FIG. 13 shows another physical location example of the simultaneous running RAID Gr. in a hard disk rack.

FIGS. 12 and 13 show an example of a method of suppressing the temperature increase due to the heat of the running hard disk in the storage apparatus 1 of this embodiment. In the hard disk rack 170, the hard disks 32 are incorporated in a hard disk enclosure 172 and thus loaded. A power supply 171 is provided at the lower portion of the hard disk rack 170.

As shown in FIGS. 12 and 13, the hard disks 32 are collectively arranged for each RAID Gr. 34 so that the RAID Gr. 34 composed of the hard disks 192 at rest surround the RAID Gr. 34 composed of the running hard disk 191. With such arrangement, the heat is dispersed to prevent the ambient temperature of the hard disk from increasing.

Figure 14:
FIG. 14 shows an example of a table listing physical locations of the RAID Gr. in the hard disk rack.

The storage management server 2 includes information for specifying the physical location of the RAID Gr. of the storage apparatus 1 in the hard disk rack 170. FIG. 14 shows an example of a table illustrative of the relation between the physical locations and the RAID Gr., that is, the RAID Gr.-physical location mapping. The vertical locations in the hard disk rack 170 of FIGS. 12 and 13 are numbered from the top like a, b, c, . . . , and the horizontal locations are numbered from the left like 1, 2, . . . . With such numbering, the RAID Gr. number is mapped with the physical locations as shown in the table of FIG. 14.

Here, the table of FIG. 14 is illustrated by way of example, and the present invention is not limited to this relation between the RAID Gr. and the physical location. Any other tables may be used insofar as the physical location of each RAID Gr. in the hard disk rack can be specified.

The RAID Gr. running scheduler 24 of the storage management server 2 searches the table of FIG. 14 for the simultaneous running RAID Gr. whose locations in the hard disk rack 170 are adjacent vertically, back-and-fourth, and horizontally. If adjacent RAID Gr. are found, the controller 11 is notified of the corresponding RAID Gr., the other simultaneous running RAID Gr., and the simultaneous operating logical volumes of the corresponding RAID Gr. Then, the controller 11 reallocates the simultaneous operating logical volumes of the RAID Gr. with a smaller number of simultaneous operating logical volumes out of the adjacent RAID Gr. notified by the RAID Gr. running scheduler 24 to the simultaneous running RAID Gr. other than the adjacent RAID Gr. to transfer the data in the allocated logical volume to the RAID Gr. having been designated as the reallocation destination.

According to the above method, it is possible to suppress the reliability drop of the hard disk due to the heat and improve the reliability of the storage apparatus 1.

Second Embodiment

Subsequently, a second embodiment of the present invention is described. In this embodiment, the storage management server 2 allocates the logical volumes to each computer 3. The logical volumes are retrieved from the RAID Gr. composed of the plurality of hard disks 32 and allocated to the computers 3. Therefore, after the logical volumes are allocated to the computers 3, the computer-volume (LU)-RAID Gr. mapping 235 as shown in FIG. 4 can be created.

Based on this table, when one or more pairs of computers simultaneously operate, it is possible to determine how may RAID Gr. are simultaneously operated and which RAID Gr. is simultaneously operated. This determination is carried out for all the combinations of computers, so the combinations of the computers can be retrieved when the RAID Gr. larger than a predetermined number of RAID Gr. simultaneously operate. FIG. 15 is a table showing an example of the retrieval result. A simultaneous running RAID Gr.-computer combination mapping 285 shows the simultaneous running RAID Gr. number and the number of simultaneous running RAID Gr. for all the combinations of computers, and includes an item indicative of a combination of computers corresponding to the number of simultaneous running RAID Gr. exceeding the predetermined number of simultaneous running RAID Gr.

The table is sent to the computer management server 4, and the computer management server 4 can display the combination of computers where the number of simultaneous running RAID Gr. exceeds the predetermined number of simultaneous running RAID Gr. on a display device (not shown) connected with the server. Thus, the running schedule can be so adjusted as to avoid the combination of computers by means of a user's instruction or a program run on the computer management server 4.

Further, after the computer running schedule is set, it is possible to display the combination of computers where the number of simultaneous running RAID Gr. exceeds the predetermined value to let a user change the computer running schedule or to automatically change the running schedule in such a way that the number of simultaneous RAID Gr. never exceeds the predetermined value by use of the program run on the computer management server 4.

The above description has been made based on the embodiments of the present invention.

In a first modification of the embodiment, the storage apparatus is a computer system for turning on/off the power supply of the plurality of hard disk units using the power on/off time on the group basis which is recorded by the system management apparatus.

In a second modification of the embodiment, the storage apparatus defines one or more logical storage areas using the hard disk unit group, and allocates the storage areas to the plurality of computers, and the system management apparatus extracts the storage areas allocated to the plurality of computers from the computer execution job information and extracts the hard disk unit group having the storage areas to create a first hard disk unit group power supply control schedule table using information about the storage areas allocated to the plurality of computers, information about the hard disk unit group having the storage areas, and a start time and stop time of the computer.

In a third modification of the embodiment, the system management apparatus extracts the start time and stop time of each computer from the running information of the plurality of computers.

In a fourth modification of the embodiment, the system management apparatus extracts a run time, a repetitive computation number, and an interval for outputting a computation result from the computer execution job information, and calculates an output time for the computation result to the hard disk unit group to which the storage area allocated to each of the plurality of computers belongs on the basis of the extracted information to create a second hard disk unit group power supply control schedule table.

In a fifth modification of the embodiment, the system management apparatus combines the first hard disk unit group power supply control schedule table with the second hard disk unit group power supply control schedule table to create a third hard disk unit group power supply control schedule table.

In a sixth modification of the embodiment, the system management apparatus searches for a time zone in which simultaneous running hard disk unit groups exceeding a predetermined number of simultaneous running hard disk unit groups run on the basis of the third hard disk unit group power supply control schedule table, extracts a corresponding time zone, corresponding simultaneous running hard disk unit groups, and simultaneous operating logical storage areas in the simultaneous running hard disk unit groups, selects a number of simultaneous running hard disk unit groups that has exceeded the predetermined number of simultaneous running hard disk unit groups from among the simultaneous running hard disk unit groups, and notifies the storage apparatus of the extracted simultaneous running hard disk unit groups, the selected number of simultaneous running hard disk unit groups that has exceeded the predetermined number of simultaneous running hard disk unit groups, and simultaneous driven logical storage areas in the simultaneous running hard disk unit groups, and the storage apparatus reallocates the simultaneous operating logical storage areas in the selected number of simultaneous running hard disk unit groups that has exceeded the predetermined number of simultaneous running hard disk unit groups, which is notified by the system management apparatus, to a simultaneous running hard disk unit group other than the selected number of simultaneous running hard disk unit groups that has exceeded the predetermined number of simultaneous running hard disk unit groups to transfer data in the reallocated logical storage areas to the hard disk unit group having been designated as the reallocation destination.

In a seventh modification of the embodiment, when the number of simultaneous running hard disk unit groups that has exceeded the predetermined number of simultaneous running hard disk unit groups are selected, the system management apparatus preferentially starts selection from a hard disk unit group with the minimum logical storage area out of the corresponding simultaneous running hard disk unit groups.

In an eighth modification of the embodiment, the system management apparatus searches for a hard disk unit group in which a time period from power-off to power-on is shorter than a predetermined time on the basis of the third hard disk unit group power supply control schedule table, and if a hard disk unit group in which a time period from power-off to power-on is shorter than the predetermined time is found, corrects the third hard disk unit group power supply control schedule table such that the power supplies of the hard disk unit groups in a portion of the schedule table corresponding to the time interval are turned on.

In a ninth modification of the embodiment, the system management apparatus obtains an elapsed time from a job start time of an execution job and a repetitive computation number from the computers that are executing computation to calculate a calculation result output time to each of the hard disk unit groups from a current time onward on the basis of the elapsed time and the repetitive computation number to correct the third hard disk unit group power supply control schedule table on the basis of the calculated computation result output time.

In a tenth modification of the embodiment, the system management apparatus obtains the number of on/off operations for each of the hard disk unit groups to search for a hard disk unit group in which the number of on/off operations for each of the hard disk unit groups exceeds a predetermined value for each of the hard disk unit groups, and if a hard disk unit group in which the number of on/off operations for each of the hard disk unit groups exceeds the predetermined value is found, notifies a control unit of a corresponding hard disk unit group, and a simultaneous operating logical storage area in the corresponding hard disk unit group, and the storage apparatus reallocates the simultaneous operating logical storage area in the hard disk unit group notified by the system management apparatus to a hard disk unit group other than the notified hard disk unit group to transfer data in the reallocated logical storage area to the other hard disk unit group.

In an eleventh modification of the embodiment, the system management apparatus searches for hard disk unit groups whose locations in a rack incorporating a hard disk unit group are adjacent vertically, back-and-fourth, and horizontally, from among the simultaneous running hard disk unit groups, and if the hard disk unit groups whose locations in the rack incorporating the hard disk unit group are adjacent are found, notifies the storage apparatus of a corresponding hard disk unit group, and a simultaneous operating logical storage area in the hard disk unit group, and the storage apparatus reallocates the simultaneous operating logical storage area in the hard disk unit group notified by the system management apparatus to a hard disk unit group other than the notified hard disk unit group to transfer data in the reallocated logical storage area to the hard disk unit group having been designated as the reallocation destination.

In a twelfth modification of the embodiment, when the plurality of computers operate, the system management apparatus calculates the pairs of simultaneous operating computers and the number of hard disk unit groups that will run simultaneously with the operating computers in the case of operating the computers for two or more combinations of the plurality of computers to display the calculation result.

In a thirteenth modification of the embodiment, the system management apparatus checks whether or not there is a combination of simultaneous operating computers with simultaneous running hard disk unit groups that exceeds a predetermined value, and if the combination of the simultaneous operating computer is found as a result of the checking, displays the combination of simultaneous operating computers, and if not found, displays that no corresponding combination of simultaneous operating computers is found.

In a fourteenth modification of the embodiment, the storage apparatus incorporates the system management apparatus.

In a fifteenth modification of the embodiment, a system management apparatus includes: a storage apparatus having a plurality of hard disk units, a storage apparatus for controlling a data write operation and a data read operation between a plurality of computers and the hard disk units and for controlling on/off states of a plurality of power supplies of the plurality of hard disk units on a group basis, wherein the system management apparatus is connected to the plurality of computers, and collecting running information about the plurality of computers and computer execution job information for each computer, and determining an on/off time of the power supplies of the plurality of hard disk units on the group basis to record the collected information and the on/off time of the power supplies on the group basis.

In a sixteenth modification of the embodiment, the system management apparatus is a computer management server and a storage management server.

In a seventeenth modification of the embodiment, a storage apparatus includes a plurality of hard disk units, the apparatus being connected to a plurality of computers and a system management apparatus, controlling a data write operation and a data read operation between the plurality of computers and the plurality of hard disk units, and controlling on/off states of a plurality of power supplies of the plurality of hard disk units on a group basis with the group including one or more hard disk units to turn on/off the power supplies of the plurality of hard disk units using a power on/off time recorded by the system management apparatus on the group basis.

In an eighteenth modification of the embodiment, the system management apparatus is incorporated in the storage apparatus.

In a nineteenth modification of the embodiment, a hard disk unit power supply controlling method for controlling a plurality of power supplies of a plurality of hard disk units of a storage apparatus in a computer system including a plurality of computers, the storage apparatus connected with the plurality of computers and having the plurality of hard disk units and a system management apparatus connected to the storage apparatus includes: controlling on/off states of the plurality of power supplies of the plurality of hard disk units on a group basis with the group including one or more hard disk units; collecting running information about the plurality of computers and computer execution job information for each computer; determining an on/off time of the power supplies of the plurality of hard disk units on the group basis to record the collected information and the on/off time of the power supplies on the group basis; and controlling the on/off states of the power supplies of the hard disk units using the recorded on/off time of the power supplies on the group basis.

What is claimed is:

1. A computer system, comprising:
a plurality of computers;
a storage apparatus having a plurality of hard disk units and being connected to the plurality of computers; and
a system management apparatus connected to the plurality of computers and the storage apparatus,
wherein the storage apparatus controls a data write operation and a data read operation between the computers and the hard disk units, and controls on/off states of a plurality of power supplies of the plurality of hard disk units on a group basis with the group including one or more hard disk units, and
wherein the system management apparatus collects running information about the plurality of computers and computer execution job information for each computer, and determines an on/off time of the power supplies of the plurality of hard disk units on the group basis to record the collected information and the on/off time of the power supplies on the group basis.

2. The computer system according to claim 1, wherein the storage apparatus turns on/off the power supplies of the plurality of hard disk units using the on/off time of the power supplies recorded by the system management apparatus on the group basis.

3. The computer system according to claim 1, wherein the storage apparatus defines one or more logical storage areas using the group of the hard disk units, and allocates the storage areas to the plurality of computers, and
the system management apparatus extracts the storage areas allocated to the plurality of computers from the computer execution job information, and extracts a hard disk unit group to which the storage area belongs to create a first hard disk unit group power supply control schedule table using information about the storage areas allocated to the plurality of computers, information about the hard disk unit group to which the storage area belongs, and a start time and a stop time of each of the computers.

4. The computer system according to claim 3, wherein the system management apparatus extracts the start time and the stop time of each of the computers from the running information about the plurality of computers.

5. The computer system according to claim 4, wherein the system management apparatus extracts a run time, a repetitive computation number, and an interval for outputting a computation result from the computer execution job information, and calculates an output time for the computation result to the hard disk unit group to which the storage area allocated to each of the plurality of computers belongs on the basis of the extracted information to create a second hard disk unit group power supply control schedule table.

6. The computer system according to claim 5, wherein the system management apparatus combines the first hard disk unit group power supply control schedule table with the second hard disk unit group power supply control schedule table to create a third hard disk unit group power supply control schedule table.

7. The computer system according to claim 6, wherein the system management apparatus searches for a time zone in which simultaneous running hard disk unit groups exceeding a predetermined number of simultaneous running hard disk unit groups run on the basis of the third hard disk unit group power supply control schedule table, extracts a corresponding time zone, corresponding simultaneous running hard disk unit groups, and simultaneous operating logical storage areas in the simultaneous running hard disk unit groups, selects a number of simultaneous running hard disk unit groups that has exceeded the predetermined number of simultaneous running hard disk unit groups from among the simultaneous running hard disk unit groups, and notifies the storage apparatus of the extracted simultaneous running hard disk unit groups, the selected number of simultaneous running hard disk unit groups that has exceeded the predetermined number of simultaneous running hard disk unit groups, and simultaneous operating logical storage areas in the simultaneous running hard disk unit groups, and
the storage apparatus reallocates the simultaneous operating logical storage areas in the selected simultaneous running hard disk unit groups exceeding the predetermined number of simultaneous running hard disk unit groups, which is notified by the system management apparatus, to a simultaneous running hard disk unit group other than the selected number of simultaneous running hard disk unit groups that has exceeded the predetermined number of simultaneous running hard disk unit groups to transfer data in the reallocated logical storage areas to the hard disk unit group having been designated as the relocation destination.

8. The computer system according to claim 7, wherein when the number of simultaneous running hard disk unit groups that has exceeded the predetermined number of simultaneous running hard disk unit groups are selected, the system management apparatus preferentially starts selection from a hard disk unit group with the minimum logical storage area out of the corresponding simultaneous running hard disk unit groups.

9. The computer system according to claim 6, wherein the system management apparatus searches for a hard disk unit group in which a time period from power-off to power-on is shorter than a predetermined time on the basis of the third hard disk unit group power supply control schedule table, and if a hard disk unit group in which a time period from power-off to power-on is shorter than the predetermined time is found, corrects the third hard disk unit group power supply control schedule table such that the power supplies of the hard disk unit groups in a portion of the schedule table corresponding to the time interval are turned on.

10. The computer system according to claim 6, wherein the system management apparatus obtains an elapsed time from a job start time of an execution job and a repetitive computation number from the computers that are executing computation to calculate a calculation result output time to each of the hard disk unit groups from a current time onward on the basis of the elapsed time and the repetitive computation number to correct the third hard disk unit group power supply control schedule table on the basis of the calculated computation result-output time.

11. The computer system according to claim 6, wherein the system management apparatus obtains the number of on/off operations for each of the hard disk unit groups to search for a hard disk unit group in which the number of on/off operations for each of the hard disk unit groups exceeds a predetermined value for each of the hard disk unit groups, and if a hard disk unit group in which the number of on/off operations for each of the hard disk unit groups exceeds the predetermined value is found, notifies a control unit of a corresponding hard disk unit group, and a simultaneous operating logical storage area in the corresponding hard disk unit group, and the storage apparatus reallocates the simultaneous operating logical storage area in the hard disk unit group notified by the system management apparatus to a hard disk unit group other than the notified hard disk unit group to transfer data in the reallocated logical storage area to the hard disk unit group having been designated as the relocation destination.

12. The computer system according to claim 6, wherein the system management apparatus searches for hard disk unit groups whose locations in a rack incorporating a hard disk unit group are adjacent vertically, back-and-fourth, and horizontally, from among the simultaneous running hard disk unit groups, and if the hard disk unit groups whose locations in the rack incorporating the hard disk unit group are adjacent are found, notifies the storage apparatus of a corresponding hard disk unit group, and a simultaneous operating logical storage area in the hard disk unit group, and the storage apparatus reallocates the simultaneous operating logical storage area in the hard disk unit group notified by the system management apparatus to a hard disk unit group other than the notified hard disk unit group to transfer data in the reallocated logical storage area to the hard disk unit group having been designated as the relocation destination.

13. The computer system according to claim 3, wherein when the plurality of computers operate, the system management apparatus calculates the pairs of simultaneous operating computers and the number of hard disk unit groups that will run simultaneously with the computers in the case of operating the computers for two or more combinations of the plurality of computers to display the calculation result.

14. The computer system according to claim 13, wherein the system management apparatus checks whether or not there is a combination of simultaneous operating computers with simultaneous running hard disk unit groups that exceeds a predetermined value, and if the combination of the simultaneous operating computer is found as a result of the checking, displays the combination of simultaneous operating computers, and if not found, displays that no corresponding combination of simultaneous operating computers is found.

15. The computer system according to claim 1, wherein the storage apparatus incorporates the system management apparatus.

16. A system management apparatus connected to a storage apparatus having a plurality of hard disk units, the storage apparatus for controlling a data write operation and a data read operation between a plurality of computers and the hard disk units and for controlling on/off states of a plurality of power supplies of the plurality of hard disk units on a group basis, wherein the system management apparatus is connected to the plurality of computers, and collecting running information about the plurality of computers and computer execution job information for each computer, and determining an on/off time of the power supplies of the plurality of hard disk units on the group basis to record the collected information and the on/off time of the power supplies on the group basis.

17. The system management apparatus according to claim 16, wherein the system management apparatus is a computer management server and a storage management server.

18. A storage apparatus, comprising a plurality of hard disk units, the storage apparatus being connected to a plurality of computers and a system management apparatus, controlling a data write operation and a data read operation between the plurality of computers and the plurality of hard disk units, and controlling on/off states of a plurality of power supplies of the plurality of hard disk units on a group basis with the group including one or more hard disk units to turn on/off the power supplies of the plurality of hard disk units using a power on/off time on the group basis recorded by the system management apparatus.

19. The storage apparatus according to claim 18, wherein the system management apparatus is incorporated in the storage apparatus.

20. A hard disk unit power supply controlling method for controlling a plurality of power supplies of a plurality of hard disk units of a storage apparatus in a computer system including a plurality of computers, the storage apparatus connected with the plurality of computers and having the plurality of hard disk units and a system management apparatus connected to the storage apparatus, the method comprising:

controlling on/off states of the plurality of power supplies of the plurality of hard disk units on a group basis with the group including one or more hard disk units;

collecting running information about the plurality of computers and computer execution job information for each computer;

determining an on/off time of the power supplies of the plurality of hard disk units on the group basis to record the collected information and the on/off time of the power supplies on the group basis; and controlling the on/off states of the power supplies of the hard disk units using the recorded on/off time of the power supplies on the group basis.

* * * * *

UNITED STATES PATENT AND TRADEMARK OFFICE
CERTIFICATE OF CORRECTION

PATENT NO. : 7,426,646 B2  Page 1 of 1
APPLICATION NO. : 11/295577
DATED : September 16, 2008
INVENTOR(S) : Kazuhisa Fujimoto It is certified that error appears in the above-identified patent and that said Letters Patent is hereby corrected as shown below:

On the cover sheet, item 56, under the heading OTHER PUBLICATIONS:

The reference is corrected as shown http://www.copansys.com/pdfs/~~Revolution2001DataSheet~~Revolution200TDataSheet.pdf.

Signed and Sealed this

Sixteenth Day of December, 2008

JON W. DUDAS
*Director of the United States Patent and Trademark Office*